(12) United States Patent
Delamour et al.

(10) Patent No.: US 6,409,337 B1
(45) Date of Patent: Jun. 25, 2002

(54) CONNECTION ASSEMBLY FOR FRAMELESS EYEGLASSES

(75) Inventors: Dominique Delamour, Les Mesnuls; Olivier Rodi, Saulx-Marchais; Alain Miklitarian, Paris, all of (FR)

(73) Assignee: WIS Sarl, Paris (FR)

( * ) Notice: Subject to any disclaimer, the term of this patent is extended or adjusted under 35 U.S.C. 154(b) by 0 days.

(21) Appl. No.: 09/802,774

(22) Filed: Mar. 9, 2001

(51) Int. Cl.[7] ................................................ G02C 5/00
(52) U.S. Cl. ........................ 351/146; 351/110; 351/141
(58) Field of Search ................................ 351/110, 140, 351/141, 146

(56) References Cited

U.S. PATENT DOCUMENTS 2,575,731 A * 11/1951 Santa ........................ 351/110
6,007,200 A * 12/1999 Tachibana ................... 351/110
6,250,755 B1 * 6/2001 Conner et al. ............... 351/110

* cited by examiner

Primary Examiner—Huy Mai
(74) Attorney, Agent, or Firm—Norris, McLaughlin & Marcus P.A.

(57) ABSTRACT

An eyeglass assembly for frameless lenses has a plug with an elongate stem placed through a hole in the lens, and a broad head on an upper end of the stem for residing within a seat in the front face of the lens. A lower portion of the stem has a series of annular radial extensions. A cylinder on the end of the temple is lined with a tubular collar made of a deformable material. As the plug is inserted into the collar with force, the extensions grip against the inside of the collar, and are retained by the collar upon release of the force. The head of the plug may be smooth and flat to provide a uniform surface for the lens face.

12 Claims, 1 Drawing Sheet

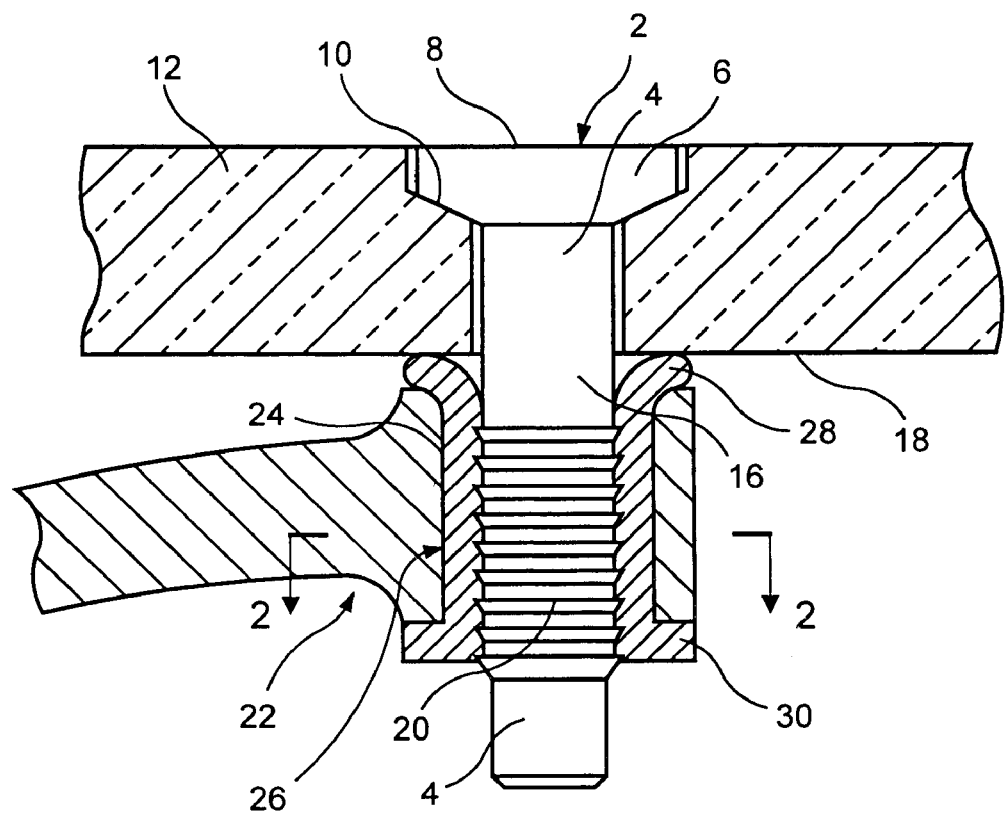
F I G. 1
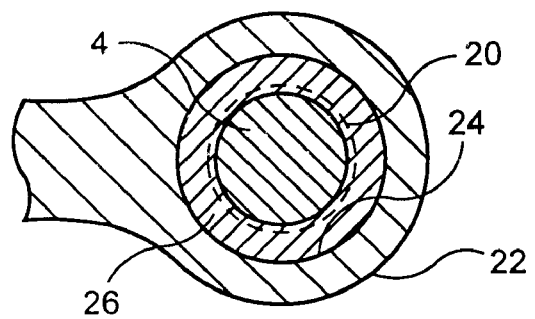
F I G. 2

CONNECTION ASSEMBLY FOR FRAMELESS EYEGLASSES

The invention relates to a connection assembly for frameless eyeglasses. More particularly, the invention relates to a means for securing eyeglass lenses directly to a temple arm.

In existing frameless lens arrangements, the lens is secured to the temple by way of a screw. There are several drawbacks to the current method. The head of the screw, sitting within a seat formed in the front face of the lens, is visible. The slot in the screw head is undesirable from a design standpoint, as it detracts from the 'clean'look sought by designers of frameless glasses. The actual connecting of the lens to the temple by means of turning the screw to the correct tightness requires a careful manual action. Besides adding time and cost to the production process, the tightening must be slowly and carefully completed: overtightening can result in breakage of the lens, and undertightening will result in a loose fit allowing movement of the lens with respect to the temple.

Accordingly, it is an object of the present invention to provide a connecting means which can be quickly and easily applied to secure the lens to the frame.

It is a further object of the invention to provide a connecting means which is esthetically pleasing, allowing for a smooth and virtually seamless outward surface.

It is a still further object to provide a connecting means which can manually applied to secure the lens to the temple, while avoiding the danger of breaking of the lens.

SUMMARY OF THE INVENTION

Accordingly, the invention comprises a lens having a hole for receiving a connecting means for connecting the lens to the temple. The temple end where connection takes place is preferably shaped as an open cylinder. A tubular collar of deformable plastic resides within the cylinder of the temple. A plug having a longitudinal stem, and a broad head on the upper end thereof, acts as the connection means between the lens and the temple. The stem has on its lower portion a series of radial extensions, preferably discrete spaced-apart annular extensions, which can be retained in a uniform manner by the collar. The extensions, which are of a harder material than the deformable material of the collar, extend outwardly with a diameter slightly greater than the inside diameter of the collar. Thus, upon assembly, the stem is placed through the hole of the lens, into the collar. Force applied to the plug allows the larger extensions to pass through the collar. Upon complete insertion of the plug into the collar, the collar retainingly grips the stem, and hence the lens, against further axial movement. A preferred embodiment has upper and lower flange extensions of the collar, which act, respectively, as a protective buffer between the temple end and the lens, and as a type of spring for allowing limited axial movement so as to provide a degree of controlled flexibility of the assembly. The upper face of the head is preferably smooth and flat, requiring no slot for a screwdriver, and can therefore reside flush with the surface of the lens to provide a generally uniform surface of the lens.

BRIEF DESCRIPTION OF THE DRAWINGS

FIG. 1 shows a side cross-sectional view of the invention.

FIG. 2 shows a partial cross-sectional view taken along line II—II.

DETAILED DESCRIPTION OF THE INVENTION

The connecting means comprises a plug 2 having an elongate stem portion 4 and a broad head portion 6, tapering outwardly and upwardly from the top of the stem portion.

The face 8 of the head is generally smooth and flat, though it may be somewhat arcuate or spherical to conform to the surface of certain lenses. The taper is shaped to match, and snugly reside within a conforming seat 10 in the lens 12. The plug is made from any suitable material, having the requisite hardness and resistance, as those skilled in the art would appreciate. Titanium is a preferred material, but surely others may be used as well, such as hard plastic.

The bottom portion 16 of the stem, that is the portion which resides behind the rear face 18 of the lens in the assembled state, is characterized by a series of radial extensions 20. In the preferred embodiment shown, the extensions are in the form of discrete annular extensions. However, other forms of extensions are contemplated, so long as they have sufficient retaining power, according the effect described below. To provide for a uniform hold, the radial reach of each of the extensions should be essentially the same.

The temple end 22 which receives and retains the lower portion of the stem is in the form of an open cylinder 24. Residing within the cylinder of the temple is a tubular collar 26, formed of a resilient material such as a deformable plastic. The outside diameter of the collar coincides generally, at least in the middle portion, with the inside diameter of temple cylinder, to reside retainingly therein. The insider diameter of the collar should be slightly smaller than the outermost diameter or reach of the extensions. When the plug is inserted through the hole of the lens, and then into the collar, pressure must be exerted on the plug to force the stem through the collar. The collar is formed of a material which will allow the stem, and its extensions to pass through the collar under force by deforming the inside surface of the collar. This deformable material may be a plastic such as Hytrel® by E.I. du Pont de Nemours & Co. Even as it deforms, the collar is exerted pressure radially inward against the extensions, and thereby against the plug. Longitudinal pressure is applied to the plug until the head of the plug resides against the seat of the lens. Once the pressure is discontinued, the plug is gripped retainingly by collar. It should be seen that the relative dimensions of the extensions and the collar should be designed in view of the deformation parameters of the collar material, to allow for insertion of the plug with reasonable manual force, while insuring that the plug, and thereby the lens, is secured by the collar upon assembly.

In addition, it is noted that a simple, one-motion, unidirectional manual force upon the plug head is all that is required to complete the assembly. No rotation of the plug is needed, nor does the head of the plug need a slot for receiving a screwdriver. There is no risk of overtightening or undertightening, since the assembly is safely completed once the head resides within the seat.

To provide further advantages, the collar may have one or both of a top 28 and bottom 30 flange, extending generally radially outwardly from the collar. The flanges may be present for a basic reason to simply retain the collar axially within the cylinder. However, additional advantages may also be achieved. The top flange may extend outwardly over the top edge of the temple cylinder, to reside against the top edge of the cylinder and the rear face of the lens, and to act as a protective buffer therebetween. In addition, when the bottom flange extends over the bottom edge of the cylinder, it acts by way of its plastic characteristics to allow some axial 'give' or movement of the lens and plug with respect to the temple, and helps to prevent breakage which may result from too much rigidity in the assembly.

It is noted that while the embodiment described envisions a cylindrical stem residing within an annular collar in an open cylindrical temple end, these relative parts need not be circular in cross-section, since rotation of the stem about the longitudinal axis is not necessary for assembly.

The head is preferably tapered on its lower face residing against the seat, to allow for ease of entry of the head into the conforming seat opening. The seat acts to retain the plug against further downward motion, and therefore also acts as a stop during assembly. Once the head is placed residingly within the seat, the assembly is complete, and this can be sensed by the assembler. Thus, the chance of overtightenining is eliminated.

What is claimed is:

1. An assembly for connecting a lens to a temple of eyeglasses, comprising:
   a plug comprising an elongate stem and a broad head on an upper end of the stem,
   a lower portion of the stem having a radial extension means,
   a tubular collar made of a deformable material, the tubular collar residing within a conformingly shaped open end of the temple,
   an inside diameter of the collar being smaller than an outermost diameter of the extension means, to a relative degree such that the lower portion of the stem may pass through the deformable collar upon longitudinal force being applied to the stem, while the collar retains the stem therein upon the release of said force.

2. The assembly of claim 1, the collar further comprising an upper flange extending radially outward from, and residing against, an upper end of the temple end.

3. The assembly of claim 1, the collar further comprising a lower flange extending radially outward from, and residing against, a lower end of the temple end.

4. The assembly of claim 1, wherein the extension means is a series of annular extensions having generally the same diameter, and spaced along the length of the lower portion of the stem.

5. The assembly of claim 1, wherein the open end of the temple is in the form of an open cylinder, and the collar is in the form of a cylindrical tube.

6. The assembly of claim 1, wherein an upper face of the head of the plug is generally smooth and flat.

7. An eyeglass assembly, comprising
   a lens having a hole from a front face through to a rear face, a portion of the hole adjacent the front face opening outwardly to form a seat in the front face,
   a plug comprising an elongate stem placed through the hole, and a broad head on an upper end of the stem for residing within the seat in the front face of the lens,
   a lower portion of the stem located beyond the rear face of the lens, the lower portion having a radial extension means,
   a tubular collar made of a deformable material, the tubular collar residing within a conformingly shaped open end of the temple,
   an inside diameter of the collar being smaller than an outermost diameter of the extension means, to a relative degree such that the lower portion of the stem may pass through the deformable collar upon longitudinal force being applied to the stem, while the collar retains the stem therein upon the release of said force.

8. The assembly of claim 7, the collar further comprising an upper flange extending radially outward from, and residing against, an upper end of the temple end, and also residing against the rear face of the lens.

9. The assembly of claim 7, the collar further comprising a lower flange extending radially outward from, and residing against, a lower end of the temple end.

10. The assembly of claim 7, wherein the extension means is a series of annular extensions having generally the same diameter, and spaced along the length of the lower portion of the stem.

11. The assembly of claim 7, wherein the open end of the temple is in the form of an open cylinder, and the collar is in the form of a cylindrical tube.

12. The assembly of claim 7, wherein an upper face of the head of the plug is generally smooth and flat, and resides generally flush with the upper face of the lens to provide a generally uniform surface thereon.

* * * * *